United States Patent [19]

Gaskell

[11] Patent Number: 5,059,289
[45] Date of Patent: Oct. 22, 1991

[54] METHOD AND ELECTRODE FOR FORMING PASSAGES IN WORKPIECES

[75] Inventor: David J. Gaskell, Suffolk, United Kingdom

[73] Assignee: Lucas Industries Public Limited Company, Birmingham, United Kingdom

[21] Appl. No.: 502,412

[22] Filed: Mar. 30, 1990

[30] Foreign Application Priority Data

Mar. 31, 1989 [GB] United Kingdom ................. 8907252

[51] Int. Cl.$^5$ ........................... B23H 9/14; B23H 3/04
[52] U.S. Cl. ........................... 204/129.55; 204/224 M; 204/280; 204/284
[58] Field of Search .............. 204/129.55, 280, 224 M, 204/284

[56] References Cited

U.S. PATENT DOCUMENTS 3,306,838 2/1967 Johnson ........................ 204/224 M
3,485,744 12/1969 Schaffner ........................ 204/290
3,696,014 10/1972 Goodard et al. .......... 204/129.55 X

FOREIGN PATENT DOCUMENTS 3531761 6/1970 Fed. Rep. of Germany .
1615520 3/1987 Fed. Rep. of Germany .

Primary Examiner—Donald R. Valentine
Attorney, Agent, or Firm—Flynn, Thiel, Boutell & Tanis

[57] ABSTRACT

A deformable electrode for electrochemical machining (ECM) of passages, in particular curved passages or passage sections in workpieces, is constructed from a deformable, electrically insulating tube having electrically conductive electrode tip means arranged around the end of the tube to form the working tip of the electrode. Electrical conductor means are connected to the electrode tip means and extend along the tube. During ECM of a passage an electrolyte solution is supplied along the center of the tube, and a voltage is applied between the workpiece the electrode tip means, via the conductor means, so that dissolution of the workpiece occurs near the electrode tip means at the working face of the passage being machined.

14 Claims, 3 Drawing Sheets

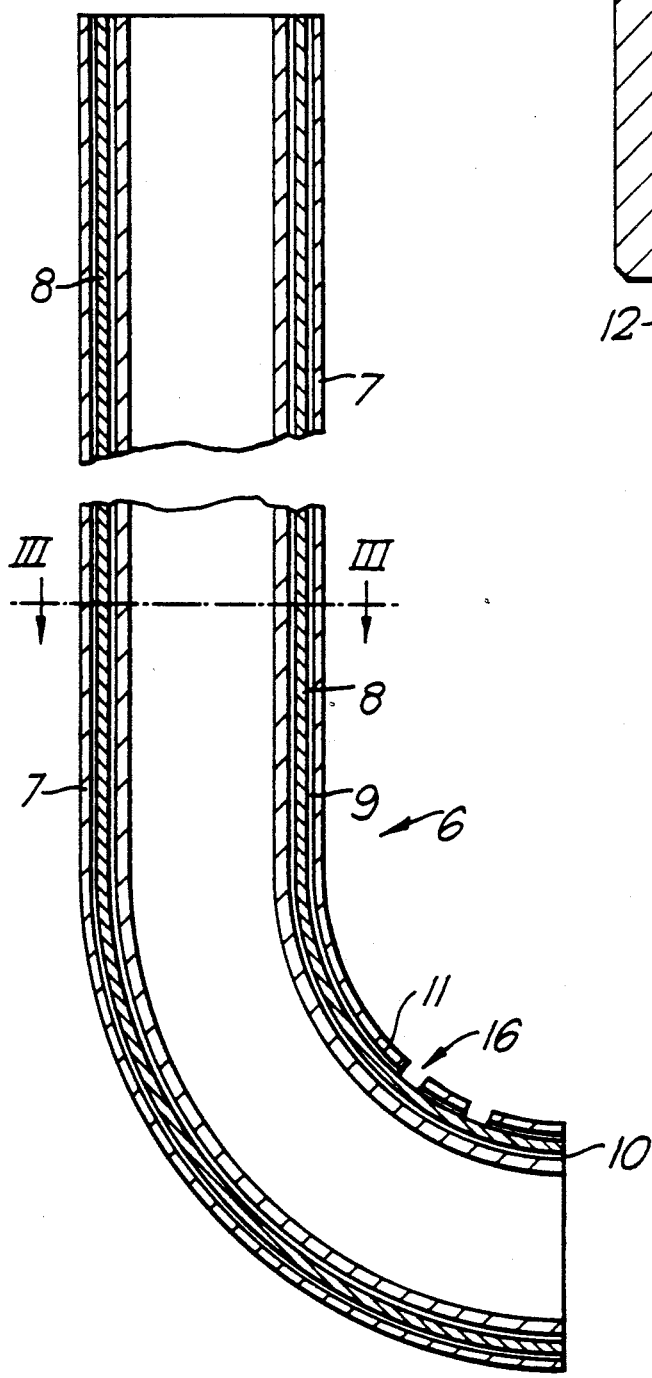
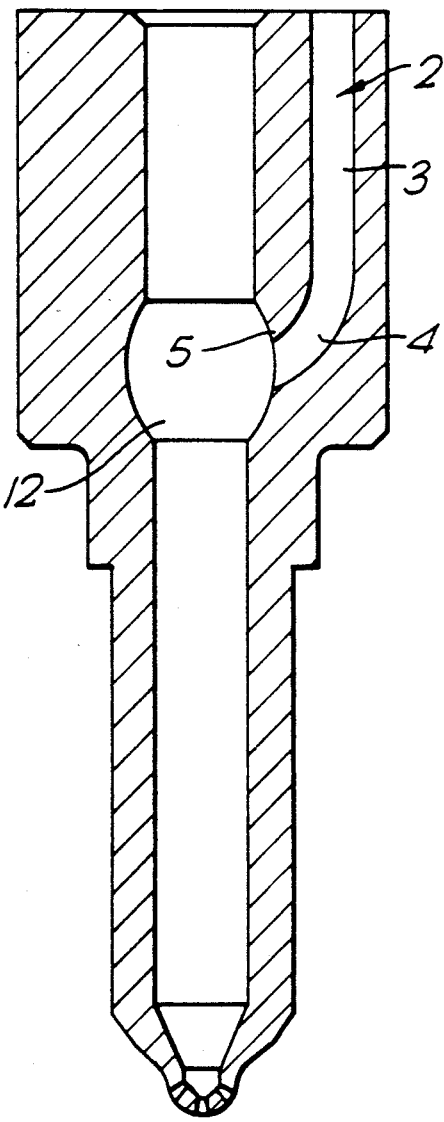

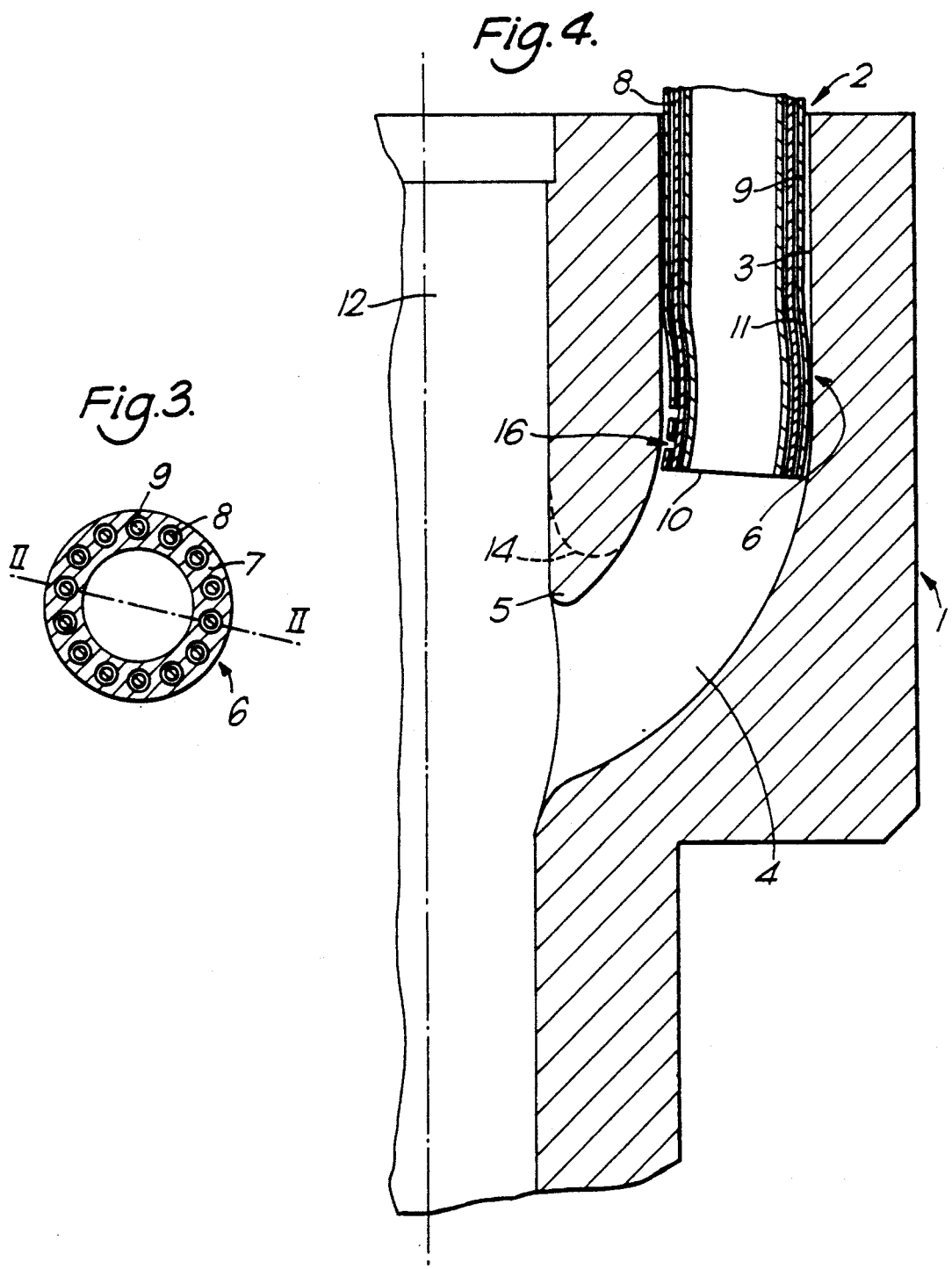

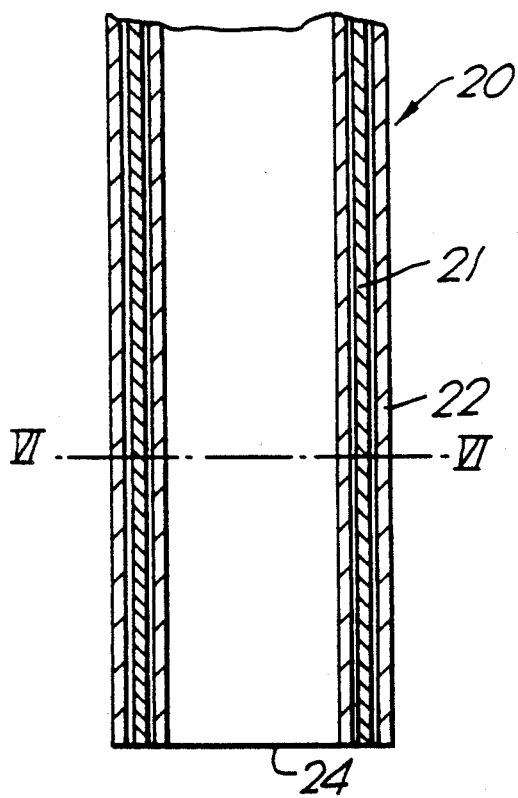
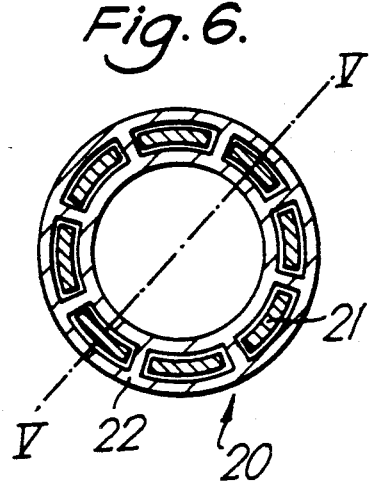
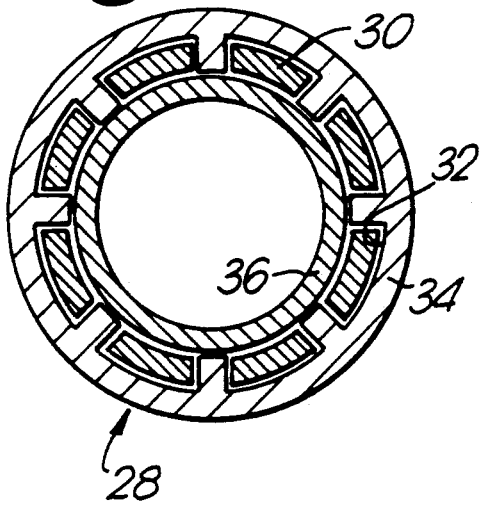
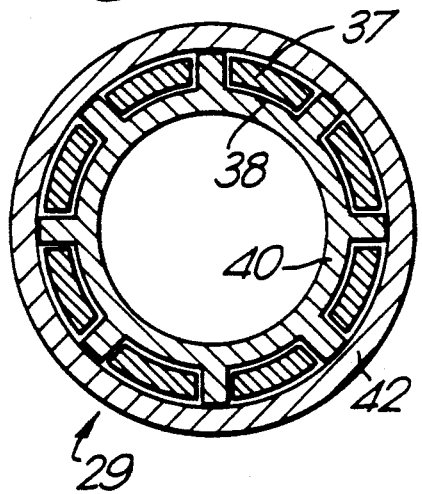

5,059,289

METHOD AND ELECTRODE FOR FORMING PASSAGES IN WORKPIECES

FIELD OF THE INVENTION

The invention relates to electrodes for electrochemical machining (ECM) of passages, in particular curved passages, in metal workpieces.

BACKGROUND OF THE INVENTION: PRIOR ART

GB 1,084,188 discloses a technique of electrical discharge machining (EDM) using a pre-shaped electrode of constant radius of curvature to machine a passage of matching curvature. Specifically GB 1,084,188 discloses an (EDM) electrode shaped immediately prior to machining. Such a method is limited however to machining passages of predetermined constant curvature.

SUMMARY OF THE INVENTION

An object of the present invention is to provide an electrode for electrochemical machining (ECM) of passages or passage sections, and in particular curved passages or passage sections, in workpieces.

To attain the object described above, according to the present invention, there is provided an electrode for electrochemical machining (ECM) of passages in workpieces, comprising a deformable, electrically insulating tube means having a first end face, an inner surface and an outer surface, said inner surface defining a passage within said tube means, said passage being adapted to carry a flow of an electrolyte during electrochemical machining, electrically conductive electrode tip means disposed at said first end of said tube means, and electrical conductor means extending from said tip means along said tube means.

In a preferred embodiment, the invention provides an electrode comprising a deformable, electrically insulating tube and a set of parallel, deformable, electrically conducting strips located longitudinally along, and spaced circumferentially around, the wall of the tube, the conducting strips being electrically insulated in use from the workpiece except at the end of the tube which forms the working tip of the electrode.

The electrode of the invention may advantageously be made sufficiently flexible to machine a passage of varying curvature in a single operation. For this purpose the electric current supplied to each of the conducting strips may be controlled independently and thus the machining rate at each area of the working face corresponding to each strip of the electrode may be controlled independently. If the machining rate on one side of the working face is thereby made greater than on the other, then a curved passage will be formed as the electrode advances during machining, the electrode being sufficiently flexible to follow the curvature. Control of the currents in the conducting strips can in this way determine both the curvature and direction of the passage machined.

According to a further aspect of the invention there is also provided an electrode for electrochemical machining wherein the electrically insulating tube is capable of being deformed prior to use to take a set of a predetermined curvature, which may not be of constant radius of curvature along its length, and the curved electrode is sufficiently resilient to be capable of being substantially elastically deformed, even for example of being straightened without losing its set.

The electrode of the invention may advantageously be used to machine a curved passage section extending from a pre-machined passage of a different curvature. By virtue of its construction, the electrode may be deformed prior to use to take a set of a predetermined curvature to match the required passage section and yet retain sufficient resilience then to be deformed elastically until for example straight, without losing the set. It may therefore be inserted into a pre-machined passage of a different curvature without losing its set. The preset electrode curvature will then be resiliently regained as the electrode machines the further passage section, whose curvature will thus match the predetermined set curvature of the electrode.

The radially outer wall of the electrically insulating tube may be perforated so as to expose the conducting means around a part of the circumference of the electrode near its working tip.

Material removal to one side of the passage being machined may be enhanced with the use of such an electrode.

BRIEF DESCRIPTION OF THE DRAWINGS

The invention will now be described in more detail by way of example with reference to the drawings in which:

FIG. 1 is a longitudinal sectional view of a diesel fuel injector nozzle body;

FIG. 2 is a longitudinal sectional view of a flexible electrode with a preformed curved section;

FIG. 3 is a cross section of the flexible electrode of FIG. 2;

FIG. 4 shows a portion of FIG. 1 on an enlarged scale with the electrode of FIGS. 2 and 3 in use;

FIG. 5 is a longitudinal sectional view of a further electrode;

FIG. 6 is a cross section of the electrode of FIG. 5;

FIG. 7 is a cross section of a further flexible electrode comprising an internally grooved outer tube and an internal sleeve; and FIG. 8 is a cross section of a further flexible electrode comprising an externally grooved inner tube and an outer sleeve.

DESCRIPTION OF THE PREFERRED EMBODIMENTS

A diesel fuel injector nozzle body 1 shown in FIG. 1 has a fuel supply passage 2. Conventionally this passage 2 is drilled as a straight hole with its axis at an acute angle to the axis of the injector, obliquely breaking into an enlarged fuel gallery 12. However, the web 5 is then very thin where the straight passage approaches the gallery 12, and due to the current demand for increased fuel injection pressure there is a significant risk of failure of the web 5. In addition, mechanically drilling a hole into the fuel gallery 12 produces burrs at the intersection of the fuel passage 2 and the gallery 12. These burrs are difficult to remove and interfere with fuel pressure pulses in the injector.

To overcome these drawbacks, ECM may be used to form a curved section of fuel supply passage 4. A straight passage section 3 is first drilled conventionally, either mechanically or otherwise, with its axis parallel to that of the nozzle body 1, and is then extended by ECM to form a curved passage section 4 entering the fuel gallery 12 at a greater angle to the nozzle axis than in the conventional fuel injectors described above, thus producing a thicker, stronger web 5. In addition, ECM produces no burrs at the intersection of the supply passage 2 and the fuel gallery 12.

The curved passage section 4 may be machined electro-chemically using the electrode 6 shown in FIGS. 2 and 3. The electrode 6 comprises a flexible electrically insulating tube 7 in the wall of which a plurality, in this instance fourteen, of parallel, flexible, electrically conducting strips 8 are longitudinally located and circumferentially spaced in channels 9 within the wall of the tube 7. The electrically conducting strips may be wholly insulated except at the working face of the electrode.

The electrically conducting strips can in principle be of any cross-sectional shape, although circular cross-section strips as shown in FIG. 3 may be used to enhance the flexibility of the electrode.

The electrode 6 may be operated conventionally, electrolyte being pumped down the centre of the tube 7 and returning between the tube and the passage walls, and a voltage being applied between the conducting elements 8 and the workpiece 1 to cause local dissolution of the workpiece opposite the electrode tip 10.

The electrode 6 may initially be manufactured straight, and the end portion 11 then deformed, typically by first warming the tube 7, to take a set of a predetermined curvature. The deformed section 11 however, by virtue of its construction, retains sufficient resilience to be inserted into the pre-machined straight passage section 3 without losing its set. During subsequent ECM, the resilience of the electrode enables it to regain its preset curvature, and so a matching curved passage section 4 is formed extending from the straight passage section 3.

The deformation of the end portion of the electrode 6 to take a set and yet retain substantial elasticity may be readily achieved if the tube 7 is made of a suitable thermoplastic material. The tube may then be deformed plastically at an elevated temperature to take the set, while at the lower temperatures at which the electrode will be used, the deformed tube will retain substantial elasticity.

By forming perforations 16 in the outer insulating side wall of the tube 7 so that the conducting elements 8 are exposed near the working tip 10 on the inner side of the curved electrode 6, material removed at the adjacent side of the passage will be enhanced. When the electrode approaches the position at which it emerges into the fuel gallery 12, machining may be continued so as to flare the opening of the fuel passage 4 into the fuel gallery 12 as shown by the dotted line 14 in FIG. 4. This has the effect of removing the thinner portion of the web 5, thus further decreasing the risk of failure of the web during operation of the injector.

The flexible electrode 20 shown in FIGS. 5 and 6 is of similar construction to that of the previous embodiment, comprising a plurality, in this example eight, of flexible conducting strips 21 longitudinally located and circumferentially spaced within the wall of a flexible, insulating tube 22. This electrode 20 may be used in the manner described above for the electrode 6.

A second machining technique for which the electrode of the invention may be used is as follows. During ECM, the current supply to each conducting strip 21 of the electrode can be controlled independently. If the machining rate on one side of the working face at the end of the passage is made greater than that on the other, the working face tends to tilt. The electrode 20 is fed progressively along the passage being machined, and its flexibility allows it to align its working tip 24 with the tilted working face and thus to machine a curved passage. The curvature of the passage may be determined by the variation of machining rates at each part of the working face and thus by appropriate control of the currents in the elements of the electrode, and by the stiffness of the electrode. The direction of curvature of the passage may be controlled via the positions of maximum and minimum machining rates on the working face.

This arrangement thus allows control of the direction and curvature of a passage at any point during machining.

Two further embodiments (28,29) of the electrode of the invention are illustrated in FIGS. 7 and 8.

As shown in FIG. 7 the electrode may be fabricated advantageously by inserting conducting strips 30 into longitudinal grooves 32 formed on the inner wall of an extruded plastics or rubber tube 34. The conducting strips may be held slidably captive in the tube by for example the shape of the longitudinal grooves or by the insertion of an insulating internal sleeve 36 within the tube 34.

Alternatively, as shown in FIG. 8, conducting strips 37 may be inserted into longitudinal grooves 38 formed on the outer surface of an extruded plastics or rubber tube 40 and held slidably captive therein by insertion of the tube into a close-fitting outer sleeve 42.

I claim:

1. An electrode for electrochemical machining of passages in workpieces, comprising:
   a deformable, electrically insulating tube means having a first end, an inner surface and an outer surface, said inner surface defining a passage within said tube means, said passage being adapted to carry a flow of an electrolyte during electrochemical machining;
   a plurality of substantially parallel, electrically conductive, deformable strips, said deformable strips being located longitudinally along and spaced circumferentially around said tube means, ends of said strips forming electrically conductive electrode tip means disposed at said first end of said tube means; and
   said deformable strips extending from said tip means along said tube means.

2. An electrode as set forth in claim 1, in which said tube means comprises:
   a tube formed with a plurality of longitudinal grooves spaced circumferentially around an inner surface of said tube, each said deformable strip being located in a respective one of said grooves.

3. An electrode as set forth in claim 2, in which said tube means comprises:
   a deformable, electrically insulating internal sleeve having a cylindrical outer surface,
   said sleeve being disposed within said tube, said cylindrical outer surface of said internal sleeve being in fitting relationship with portions of said inner surface of said tube between said grooves.

4. An electrode as set forth in claim 1, in which said tube means comprises:
   a deformable, electrically insulating tube, said tube having an outer surface formed with a plurality of longitudinal grooves spaced circumferentially around said outer surface, and a deformable, electrically insulating sleeve, each said deformable strip being located in a respective one of said grooves in said outer surface of said tube, and said sleeve being disposed around said inner tube, an inner surface of said sleeve being in fitting relationship with portions of said outer surface of said tube between said grooves.

5. An electrode as set forth in claim 1, in which said tube is formed with a plurality of longitudinal channels, said channels being formed in said tube means between said inner surface and said outer surface of said tube means, each of said strips being located in a respective one of said channels.

6. An electrode as set forth in claim 1, in which said conductive, deformable strips are insulated from said electrolyte and from said workpiece except at said first end of said tube means.

7. An electrode as set forth in claim 1, in which said electrode is capable of being deformed to take a set and yet retain substantial elasticity.

8. An electrode as set forth in claim 1, in which said tube means comprises a thermoplastic material, said thermoplastic material being plastically deformable at elevated temperatures and elastically deformable at an operating temperature of said electrode.

9. An electrode as set forth in claim 1, in which perforations are formed between said electrode tip means and said outer surface of said tube means at one side of said tube near said first end of said tube means so as to expose said tip means around a portion of said outer surface of said tube means near said end.

10. An electrode as set forth in claim 1, in which said tube means comprises a thermoplastic material, said electrode being plastically deformable at elevated temperatures to take a set, and elastically deformable at an operating temperature of said electrode.

11. An electrode for electrochemical machining of passages in workpieces, comprising:

a thermoplastic, electrically insulating tube means having a first end, an outer surface, and an inner surface means defining a passage within said tube means for carrying a flow of an electrolyte in direct contact with said inner surface means during electrochemical machining;

electrically conductive electrode tip means disposed at said first end of said tube means;

electrical conductor means extending from said tip means along said tube means; and said electrode being plastically deformable at elevated temperatures to take a set, and elastically deformable at an operating temperature of said electrode.

12. An electrode according to claim 11, wherein said theremoplastic tube means and said electrical conductor means have respective lengths which are approximately equal.

13. A method of using electrochemical machining to form in a workpiece a curved passage section which extends from the end of a pre-existing blind passage section of a different curvature, comprising the steps of:

(a) providing an electrode which comprises:

a thermoplastic, electrically insulating tube means having a first end, an inner surface and an outer surface, said inner surface defining a passage within said tube means, said passage being adapted to carry a flow of electrolyte during electrochemical machining, electrically conductive electrode tip means disposed at said first end of said tube means, and electrical conductor means extending from said tip means along said tube means;

(b) providing said workpiece in which said blind passage section has been formed;

(c) heating said electrode to an elevated temperature at which it is plastically deformable, plastically deforming said electrode at said elevated temperature to take a set of the desired curvature of said curved passage section, and cooling said electrode to a temperature at which it is elastically deformable and not readily plastically deformable; and (d) inserting said electrode into said blind passage section, said inserting step including the step of deforming said electrode elastically to match said curvature of said blind passage section, and electrochemically machining said curved passage section extending from said blind passage section while simultaneously permitting said electrode to elastically regain its set curvature inside said workpiece.

14. A method as set forth in claim 13, in which said preexisting blind passage section is a straight passage section.

* * * * *